United States Patent
Dowling et al.

(10) Patent No.: US 7,614,493 B2
(45) Date of Patent: Nov. 10, 2009

(54) BELT TRACKING REGULATOR

(76) Inventors: John Dowling, 11 Leawood Ct., Lindale, GA (US) 30147; Stefanus Petrus Bezuidenhout, 1700 Spring La., Sanford, NC (US) 27330

(*) Notice: Subject to any disclaimer, the term of this patent is extended or adjusted under 35 U.S.C. 154(b) by 197 days.

(21) Appl. No.: 11/736,153

(22) Filed: Apr. 17, 2007

(65) Prior Publication Data

US 2008/0073182 A1    Mar. 27, 2008

(30) Foreign Application Priority Data

Sep. 22, 2006    (ZA) ................................ 06/7947

(51) Int. Cl.
B65G 39/16    (2006.01)
(52) U.S. Cl. .................. 198/806; 198/808; 198/810.03; 198/837
(58) Field of Classification Search ................ 198/806, 198/807, 808, 810.01, 810.03
See application file for complete search history.

(56) References Cited

U.S. PATENT DOCUMENTS

| | | | | |
|---|---|---|---|---|
| 994,910 A * | 6/1911 | Duesterhoff | ................ | 198/806 |
| 1,815,099 A * | 7/1931 | Foote | ......................... | 198/808 |
| 1,963,099 A * | 6/1934 | Davis | ......................... | 198/808 |
| 2,109,925 A * | 3/1938 | Mitchell | ..................... | 198/808 |
| 2,109,956 A * | 3/1938 | Corbin | ........................ | 198/806 |
| 2,892,534 A * | 6/1959 | Ogden | ......................... | 198/808 |
| 3,002,606 A * | 10/1961 | Lo Presti | ................... | 198/808 |
| 3,066,547 A * | 12/1962 | Evans et al. | ................. | 198/806 |
| 3,240,321 A * | 3/1966 | Lo Presti et al. | ............ | 198/808 |
| 3,993,186 A * | 11/1976 | Sokolowski | ................. | 198/806 |
| 5,078,263 A * | 1/1992 | Thompson et al. | .......... | 198/807 |
| 5,101,980 A * | 4/1992 | Arvidson | .................... | 198/807 |
| 5,358,098 A * | 10/1994 | Sundstrom et al. | .......... | 198/806 |
| 5,373,935 A * | 12/1994 | Anderson | ................... | 198/808 |
| 6,173,830 B1 * | 1/2001 | Cumberlege et al. | ........ | 198/842 |
| 6,550,606 B2 * | 4/2003 | Tapp | .......................... | 198/808 |
| 6,776,280 B2 * | 8/2004 | Hovstø et al. | ............... | 198/806 |

* cited by examiner

*Primary Examiner*—Gene Crawford
*Assistant Examiner*—William R Harp
(74) *Attorney, Agent, or Firm*—Thomas, Kayden, Horstemeyer & Risley, LLP.

(57) ABSTRACT

A roller assembly for supporting a moving belt and including at least one roller mounted for rotation about a roller axis; and a support arrangement, the roller assembly being mounted on the support arrangement for pivotal displacement about a pivot point, characterized in that the belt tracking regulator includes guide means operable, in use, to constrain the pivotal displacement of the roller assembly to move in a plane containing the pivot and tilted at an acute angle with respect to a horizontal plane defined through the pivot point.

16 Claims, 3 Drawing Sheets

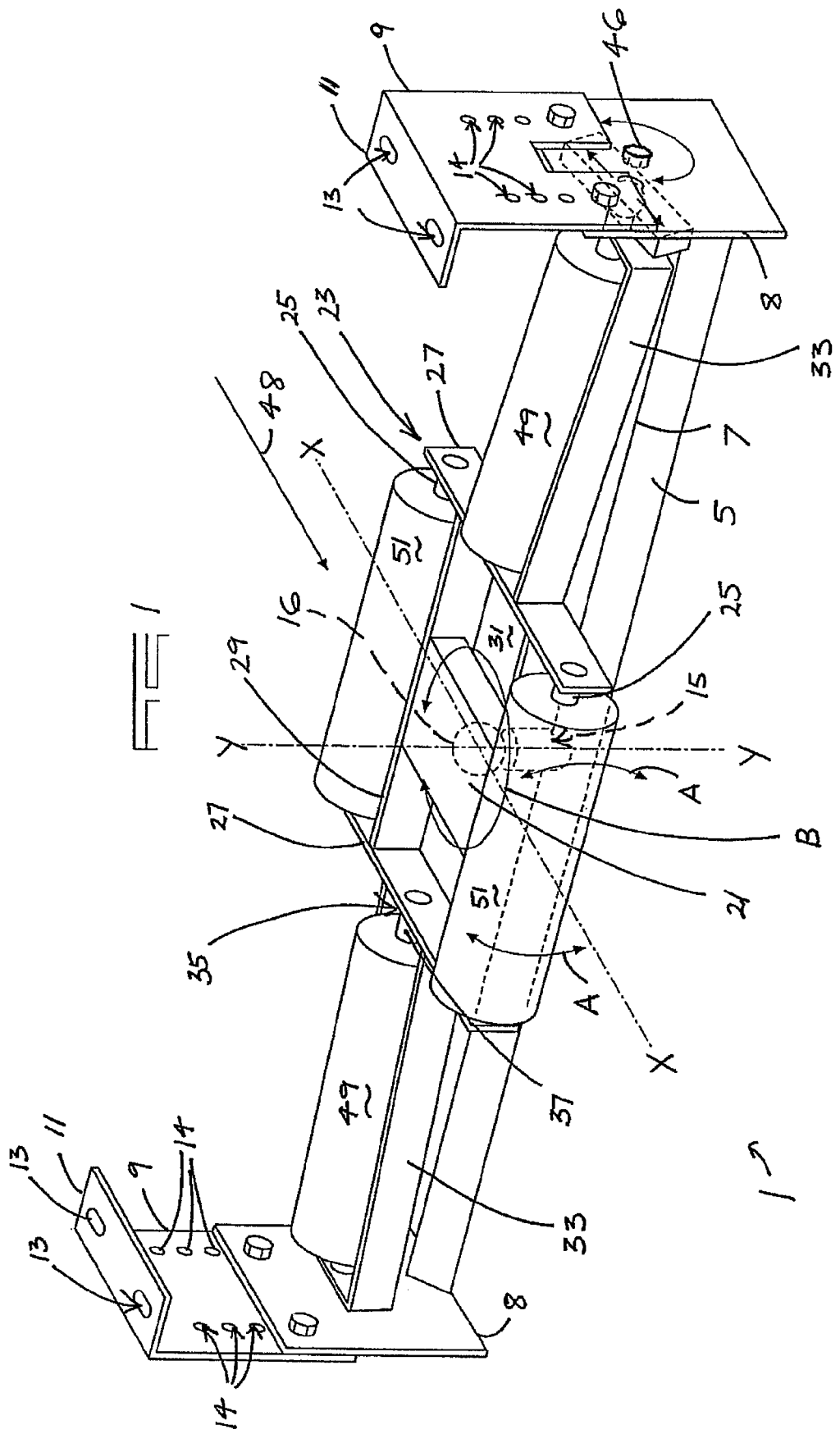

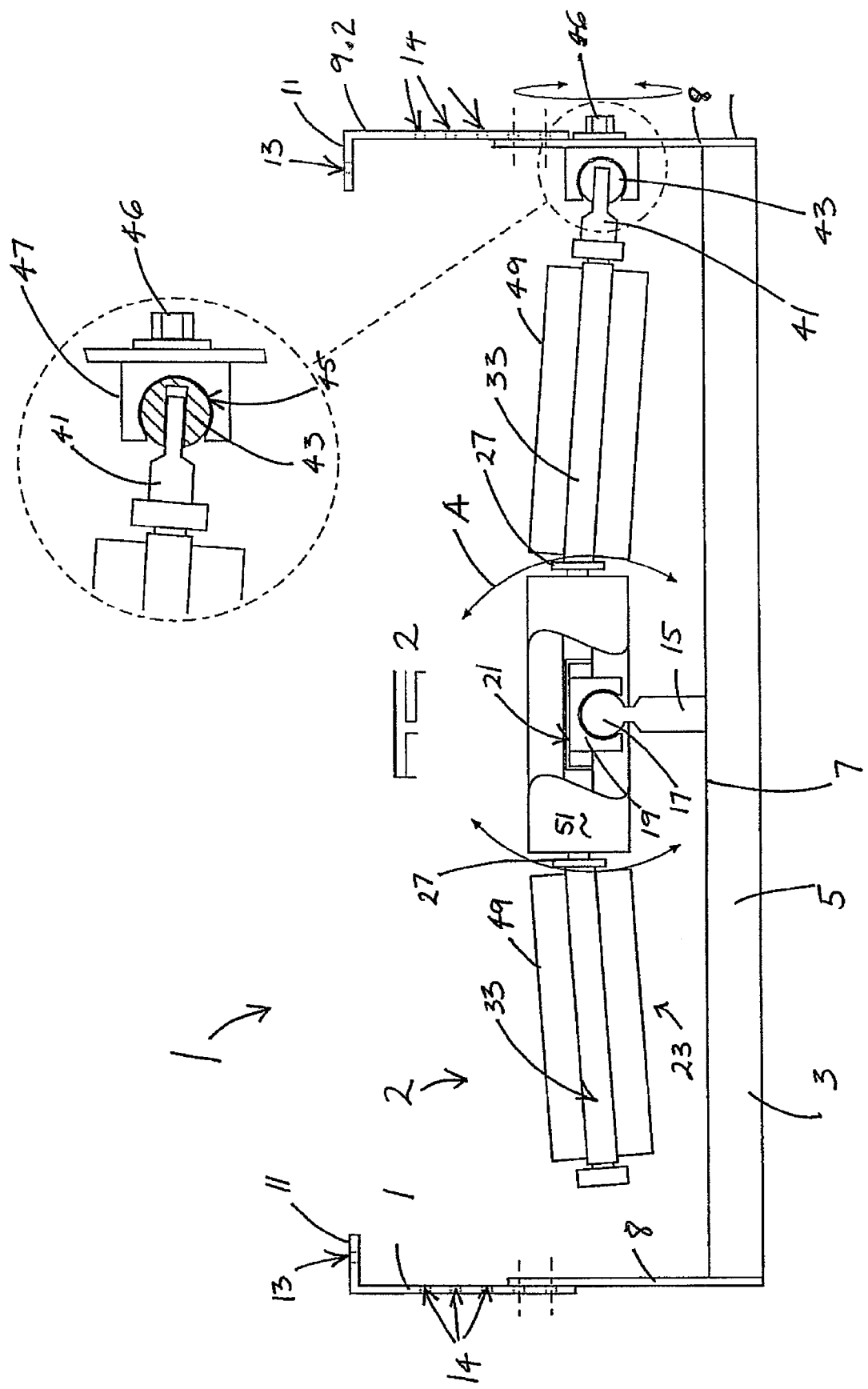

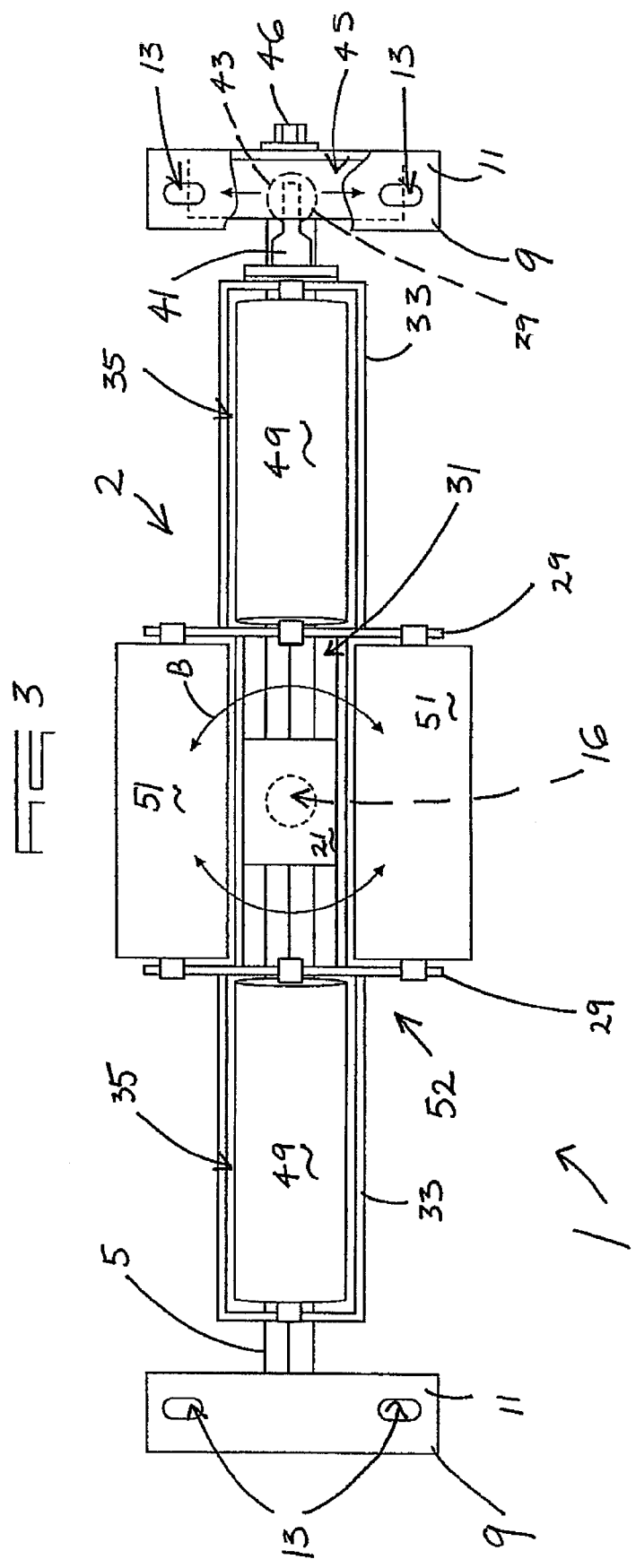

BELT TRACKING REGULATOR

FIELD OF THE INVENTION

This invention relates to belts and, in particular, to conveyor belts. More specifically, the invention relates to a belt tracking regulator for use on conveyor belts.

BACKGROUND TO THE INVENTION

Several mechanisms exist for regulating the tracking of conveyor belts to ensure that a belt tracks true and does not wander laterally as it moves. Failure to track correctly may have costly consequences, including damage to the belt, the supporting frame, and spillage of material being transported.

A mechanism for regulating the tracking of a conveyor belt which is easy to install, requires low activating forces and low maintenance would accordingly be advantageous. It would also be advantageous to have a mechanism which does not operate by impacting or abrading the edge of the belt, since this leads to belt damage.

Bi-directional conveyor belts, in which the direction of belt travel may be reversed, require a higher level of alignment accuracy than belts, which travel in one direction only.

While this invention will be described with particular reference to the tracking of conveyor belts, it is to be understood that the invention can be used in a number of different applications such as the tracking of other endless belts and other endless flexible materials.

OBJECT OF THE INVENTION

The object of this invention is to provide a simple yet effective mechanism for regulating the tracking of conveyor belts, particularly a mechanism which is operable with bi-directional conveyor belts, which at least partly achieves the abovementioned objectives and alleviates the problems set out.

SUMMARY OF THE INVENTION

In accordance with this invention there is provided a belt tracking regulator including
 a roller assembly for supporting a moving belt and including at least one roller mounted for rotation about a roller axis; and
 a support arrangement, the roller assembly being mounted on the support arrangement for pivotal displacement about a pivot point
characterized in that
 the belt tracking regulator includes guide means operable, in use, to constrain the pivotal displacement of the roller assembly to move in a plane containing the pivot and tilted at an acute angle with respect to a horizontal plane defined through the pivot point.

In a preferred embodiment of the invention, the belt tracking regulator has a plurality of longitudinally spaced rollers. The rollers may include at least one intermediate roller and two outer rollers, which may be angled with respect to the at least one intermediate roller to define a generally convex up curve and thereby provide a crowned support for a belt. Further preferably, the roller assembly has two laterally spaced parallel intermediate rollers. The rollers may be supported on a sub-frame.

The support arrangement may comprise a support frame on which is mounted a ball component of a ball joint, a complementary socket component of which is mounted on the sub-frame, thereby enabling the entire roller assembly to pivot with respect to the support frame about the ball component. It will be appreciated that the centre of the ball component defines the pivot point for the roller assembly.

The guide means may comprise a pin receivable in a mating groove formation attached to the support frame, the pin being attached to an end of one of the outer rollers. Preferably, the mating groove formation is adjustable to vary the inclination of the groove. The groove formation may be manually or automatically adjustable. Further preferably, the pin has a spherical head and the groove has a circular cross-section, the groove being shaped to entrap the head of the pin to prevent disengagement from the groove, but allowing the head to slide freely along the groove. Still further, the pin may be operable to telescope to allow the head and groove to remain engaged and the pin to slide freely as the roller assembly pivots under loading.

The invention extends to a belt tracking regulator including a roller assembly supported on a sub-frame, the roller assembly supporting a moving belt and including at least one roller mounted for rotation about a roller axis; and a support frame on which is mounted a ball component of a ball joint, a complementary socket component of which is mounted on the sub-frame for pivotal displacement about the ball component.

The invention further extends to a conveyor system including a plurality of roller assemblies, at least one of which is a belt tracking regulator as hereinbefore described.

BRIEF DESCRIPTION OF THE DRAWINGS

The invention will be described, by way of example only, with reference to the drawings in which:
 FIG. 1 is a perspective view of a belt tracking regulator in accordance with the invention;
 FIG. 2 is an elevation view of the belt tracking regulator of FIG. 1; and
 FIG. 3 is a plan view of the belt tracking regulator of FIGS. 1 and 2.

DETAILED DESCRIPTION OF THE INVENTION

A belt tracking regulator 1 is shown in FIGS. 1 to 3 and includes a support arrangement formed by a support frame 3 which may be attached to a conveyor belt frame (not shown) via bolts (not shown) at either end thereof.

In this description, the belt tracking regulator will be described as it is normally oriented in use as shown in the drawings.

The frame 3 has a horizontal cross bar 5 formed from a steel angle section, which is positioned with its apex 7 facing up, and welded at each end to a steel plate. Each plate 8 is bolted to a mounting bracket 9 having an upper inwardly bent flange 11, the flange 11 having two elongate slots 13 extending therethrough, for receiving a bolt to connect into standard mounting holes (not shown) on a conveyor frame. The vertical distance between the tracking regulator 1 relative to the conveyor frame may be adjusted as there are a plurality of vertically spaced pairs of holes 14 on the bracket 9, any of which may receive the bolt pair for connection to the steel plate 8.

Extending upwardly from the centre of the cross bar 5 is a post 15 carrying a ball component of a ball joint 17 for mating with a complementary socket component 19 in a hitch 21 carried on a roller sub-frame 23, which is described in more detail below.

Above the cross bar 5, parallel to a plane defined by the conveyor belt, are a pair of spaced apart, parallel shafts 25 journalled at either end to a pair of flat elongate brackets 27. In between the shafts 25 are a pair of spaced, parallel flat cross members 29, the shafts 25 and cross members 29 defining a central rectangular space 31 therebetween.

On the outer side of each elongate bracket 27, a U-shaped bracket 33 is fixed at either free end thereto in cantilever fashion and positioned centrally along the length of each bracket 27. The U-shaped bracket 33 and the elongate bracket 27 to which it is fixed define an elongate rectangular space 35.

A pair of outer shafts 37, their axes collinear in plan view, are located in each elongate rectangular space 35 and are journalled at the elongate bracket 27 and at the closed end 39 of the U-shaped bracket 33. The outer shafts 37 are angled downwardly with respect to the centre shafts 25 thereby supporting the belt in a crowned position. The angle of inclination is approximately 12 degrees in this embodiment, but it will be readily appreciated by a person skilled in the art that the angle of inclination may be varied from one application to another, depending on several factors including conveyor carrying capacity and belt length. Shafts 25 carry intermediate idler rollers 51 and shafts 37 carry outer idler rollers 49 and 51 rotatably mounted on the shaft via bearings thereby forming a roller assembly 52 for supporting a moving belt (not shown).

The rightmost mounting bracket 9.2 has a pin 41 projecting therefrom carrying a spherical head to provide the ball 43 of a ball-type joint. The pin is able to telescope to allow the ball 43 to move axially relative to the pin 41. The ball 43 is accommodated in a cross-sectionally circular mating slot 45 in a housing 47 which, in turn, is rotatably secured to the mounting bracket 9.2, its position being adjustable by way of an adjustment nut 46. The slot 45 is linear and accordingly permits the ball 43 to move linearly thereinside.

In the central rectangular space 31, a socket hitch 21 spans between the support members 29, the socket 19 being shaped and dimensioned to pivotally accommodate the ball 17.

Once installed, the inclination of the housing 47 with respect to the horizontal plane is set by a technician by rotating an adjusting bolt. It will be appreciated that when the belt tracking regulator 1 is used with a bi-directional conveyor system, the housing will be rotated by approximately 180 degrees each time the belt direction is reversed. In the drawings, the position of the housing 47 is shown for use with a belt moving in the direction of the arrow 48.

In use, if the belt drifts off centre, an eccentric load is placed on either one of the outer idlers 49, causing the entire roller assembly 52 to pivot about the pivot point, defined by the ball component 17, so that the heavier side of the belt is lower than the lighter side. The pivot action is shown by arrows A and B. Importantly, when viewed in side view, as shown in FIG. 2, the increased load on one or other of the idler rollers 49 causes the roller assembly 52 to roll about an axis X through the pivot point, as shown by the arrows A, while simultaneously the roller assembly yaws about an axis Y, normal to axis X parallel to the direction of movement of the belt, as shown by the arrows B in FIG. 3.

As the roller on the lower, heavier, side is also caused to move away from the direction of movement of the belt, it contacts the belt after the roller on the other side. The belt moves back towards the belt which is on the lighter side causing the belt to retain its normal tracking alignment and the roller assembly 52 to return to its equilibrium position. Since the ball slot 45 may be rotated by 360 degrees relative to the mounting bracket 9.2, the direction of the belt may be reversed, the housing 47 and its slot rotated appropriately without it being necessary to disassemble the entire mechanism.

Several modifications to this embodiment are possible without departing from the scope of the invention. For example, the outer rollers need not be inclined relative to the centre rollers. Also, other pivoting mechanisms may be used instead of a ball and socket mechanism. The adjusting means may also be varied and may be automatically operated. Further, the pivot point need not be at the centre of the tracking mechanism.

It will be readily appreciated that this invention provides a simple yet effective means for tracking conveyor belts, including reversible belts, to ensure that a belt travels along the centre line of its path on the conveyor frame.

The invention claimed is:

1. A belt tracking regulator comprising:
   a roller assembly for supporting a moving belt and including at least one intermediate roller mounted for rotation about a roller axis, the roller assembly further including at least one outer roller;
   a support arrangement, the roller assembly being mounted on the support arrangement for pivotal displacement about a pivot point; and
   guide means operable, in use, to constrain the pivotal displacement of the at least one intermediate roller to move in a plane containing the pivot point and tilted at an acute angle with respect to a horizontal plane defined through the pivot point,
   wherein the guide means comprises a pin receivable in a mating slot formation attached to the support arrangement, wherein guide means is operable to allow the pin to slide linearly in the mating slot formation as the roller assembly pivots under loading,
   wherein the pin is operable to telescope to allow the pin and mating slot formation to remain engaged while the pin is operable to slide freely as the roller assembly pivots under loading.

2. A belt tracking regulator as claimed in claim 1, wherein the roller assembly includes a plurality of rollers spaced perpendicular to the travelling direction of the moving belt.

3. A belt tracking regulator as claimed in claim 1, further comprising at least one intermediate roller and two outer rollers.

4. A belt tracking regulator as claimed in claim 3, wherein the outer rollers are angled with respect to the at least one intermediate roller to define a generally convex-up curve.

5. A belt tracking regulator as claimed in claim 1, wherein the roller assembly includes two parallel intermediate rollers spaced parallel to the travelling direction of the moving belt.

6. A belt tracking regulator as claimed in claim 5, wherein the parallel intermediate rollers are supported on a sub-frame.

7. A belt tracking regulator as claimed in claim 5, wherein the horizontal plane defined through the pivot point intersects the two parallel intermediate rollers.

8. A belt tracking regulator as claimed in claim 1, wherein the support arrangement comprises a support frame on which is mounted a ball component of a ball joint, a complementary socket component of which is mounted on a sub-frame.

9. A belt tracking regulator as claimed in claim 1, the pin being attached to an end of one of a plurality of outer rollers.

10. A belt tracking regulator as claimed in claim 9, wherein the mating slot formation is adjustable to vary the inclination of the mating slot.

11. A belt tracking regulator as claimed in claim 9, wherein the mating slot formation is adjustable.

12. A belt tracking regulator as claimed in claim 9, wherein the pin has a spherical head and the mating slot has a circular cross-section, the mating slot being shaped to entrap the spherical head of the pin to prevent disengagement from the mating slot while allowing the spherical head to slide freely along the mating slot.

13. A belt tracking regulator comprising:
- a roller assembly supported on a sub-frame, the roller assembly supporting a moving belt and including at least one roller mounted for rotation about a roller axis;
- an outer roller coupled to the roller assembly, the outer roller including a pin having a head; and
- a support frame on which is mounted a ball component of a ball joint, a complementary socket component of the ball joint being mounted on the sub-frame for pivotal displacement about the ball component, the support frame further including a housing that defines a mating slot, the mating slot being sized and shaped to entrap the head of the pin of the outer roller, the pin of the outer roller being operable to telescope to allow the head and mating slot to remain engaged while allowing the head to slide linearly along the mating slot.

14. A belt tracking regulator as claimed in claim 13, wherein the head is a spherical head.

15. A belt tracking regulator as claimed in claim 13, wherein the mating slot is linear and includes a circular cross-section.

16. A conveyor system comprising:
- a plurality of roller assemblies, wherein at least one of the plurality of roller assemblies is a belt tracking regulator comprising:
  - a roller assembly for supporting a moving belt and including at least one roller mounted for rotation about a roller axis;
  - a support arrangement, the roller assembly being mounted on the support arrangement for pivotal displacement about a pivot point; and
  - guide means operable, in use, to constrain the pivotal displacement of the roller assembly to move in a plane containing the pivot point and tilted at an acute angle with respect to a horizontal plane defined through the pivot point,
- wherein the guide means further comprises a pin means for telescoping to allow the pin means and a mating slot means to remain engaged while the pin means is operable to slide freely as the roller assembly pivots under loading.

* * * * *